United States Patent
Shayevitz et al.

(10) Patent No.: US 10,382,484 B2
(45) Date of Patent: *Aug. 13, 2019

(54) DETECTING ATTACKERS WHO TARGET CONTAINERIZED CLUSTERS

(71) Applicant: ILLUSIVE NETWORKS LTD., Tel Aviv (IL)

(72) Inventors: Hanoch Shayevitz, Jerusalem (IL); Yair Fried, Petach Tikva (IL); Matan Kubovsky, Tel Aviv (IL)

(73) Assignee: ILLUSIVE NETWORKS LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/163,579

(22) Filed: Oct. 18, 2018

(65) Prior Publication Data

US 2019/0089737 A1 Mar. 21, 2019

Related U.S. Application Data

(63) Continuation-in-part of application No. 15/722,351, filed on Oct. 2, 2017, now Pat. No. 10,142,367, which
(Continued)

(51) Int. Cl.
*H04L 29/06* (2006.01)
*G06F 21/56* (2013.01)
(Continued)

(52) U.S. Cl.
CPC .......... *H04L 63/1491* (2013.01); *G06F 21/55* (2013.01); *G06F 21/554* (2013.01);
(Continued)

(58) Field of Classification Search
CPC .......... G06F 12/14; G06F 11/00; G06F 12/16; G06F 21/57; G06F 21/56; G06F 21/577;
(Continued)

(56) References Cited

U.S. PATENT DOCUMENTS

| 6,363,489 B1 | 3/2002 | Comay et al. |
| 6,618,709 B1 | 9/2003 | Sneeringer |

(Continued)

FOREIGN PATENT DOCUMENTS

| WO | 2006131124 A1 | 12/2006 |
| WO | 2015001969 A1 | 1/2015 |
| WO | 2015047555 A1 | 4/2015 |

OTHER PUBLICATIONS

Wikipedia, Active Directory, https://en.wikipedia.org/wiki/Active_Directory, Jun. 24, 2015.
(Continued)

*Primary Examiner* — Thanhnga B Truong
(74) *Attorney, Agent, or Firm* — Soquel Group I.P Ltd.

(57) ABSTRACT

A method for operation of a deception management server, for detecting and hindering attackers who target containerized clusters of a network, including learning the network environment, including finding existing container instances, finding existing services and relationships, extracting naming conventions in the environment, and classifying the most important assets in the environment, creating deceptions based on the learning phase, the deceptions including one or more of (i) secrets, (ii) environment variables pointing to deceptive databases, web servers or active directories, (iii) mounts, (iv) additional container instances comprising one or more of file server, database, web applications and SSH, (v) URLs to external services, and (vi) namespaces to fictional environments, planting the created deceptions via a container orchestrator, via an SSH directly to the containers, or via the container registry, and issuing an alert when an attacker attempts to connect to a deceptive entity.

14 Claims, 9 Drawing Sheets

Related U.S. Application Data is a continuation of application No. 15/403,194, filed on Jan. 11, 2017, now Pat. No. 9,787,715, which is a continuation of application No. 15/004,904, filed on Jan. 23, 2016, now Pat. No. 9,553,885.

(60) Provisional application No. 62/172,251, filed on Jun. 8, 2015, provisional application No. 62/172,253, filed on Jun. 8, 2015, provisional application No. 62/172,255, filed on Jun. 8, 2015, provisional application No. 62/172,259, filed on Jun. 8, 2015, provisional application No. 62/172,261, filed on Jun. 8, 2015.

(51) Int. Cl.
  *G06F 21/57* (2013.01)
  *G06F 21/55* (2013.01)
  *G06N 20/00* (2019.01)

(52) U.S. Cl.
  CPC ............ *G06F 21/56* (2013.01); *G06F 21/577* (2013.01); *G06N 20/00* (2019.01); *H04L 63/102* (2013.01); *H04L 63/1416* (2013.01); *H04L 63/1425* (2013.01); *H04L 63/1441* (2013.01); *H04L 63/20* (2013.01); *H04L 29/06904* (2013.01); *H04L 63/10* (2013.01); *H04L 63/1433* (2013.01); *H04L 2463/146* (2013.01)

(58) Field of Classification Search
  CPC ......... G06F 21/55; G06F 21/554; H04L 9/32; H04L 29/06; H04L 63/1491; H04L 63/145; H04L 63/1416; H04L 63/1425; H04L 63/20; H04L 63/102; H04L 63/1441; H04L 2463/146; H04L 29/06904; H04L 63/10; H04L 63/1433; G06N 99/005
  USPC ...... 726/22–26, 11; 709/228, 220, 224, 206; 455/410; 714/43
  See application file for complete search history.

(56) References Cited

U.S. PATENT DOCUMENTS

| | | |
|---|---|---|
| 7,065,657 B1 | 6/2006 | Moran |
| 7,089,589 B2 | 8/2006 | Chefalas et al. |
| 7,093,291 B2 | 8/2006 | Bailey |
| 7,516,227 B2 | 4/2009 | Cohen |
| 7,574,741 B2 | 8/2009 | Aviani et al. |
| 7,636,944 B2 | 12/2009 | Raikar |
| 7,665,134 B1 | 2/2010 | Hernacki et al. |
| 7,694,339 B2 | 4/2010 | Blake et al. |
| 7,725,937 B1 | 5/2010 | Levy |
| 7,752,664 B1 | 7/2010 | Satish et al. |
| 7,945,953 B1 | 5/2011 | Salinas et al. |
| 8,015,284 B1 | 9/2011 | Isenberg et al. |
| 8,181,249 B2 | 5/2012 | Chow et al. |
| 8,181,250 B2 | 5/2012 | Rafalovich et al. |
| 8,250,654 B1 | 8/2012 | Kennedy et al. |
| 8,375,447 B2 | 2/2013 | Amoroso et al. |
| 8,499,348 B1 | 7/2013 | Rubin |
| 8,528,091 B2 | 9/2013 | Bowen et al. |
| 8,549,642 B2 | 10/2013 | Lee |
| 8,549,643 B1 * | 10/2013 | Shou ............ G06F 21/556 455/410 |
| 8,719,938 B2 | 5/2014 | Chasko et al. |
| 8,739,281 B2 | 5/2014 | Wang et al. |
| 8,739,284 B1 | 5/2014 | Gardner |
| 8,769,684 B2 | 7/2014 | Stolfo et al. |
| 8,819,825 B2 | 8/2014 | Keromytis et al. |
| 8,856,928 B1 | 10/2014 | Rivner et al. |
| 8,881,288 B1 | 11/2014 | Levy et al. |
| 8,925,080 B2 * | 12/2014 | Hebert ............ H04L 63/1491 726/23 |
| 9,009,829 B2 | 4/2015 | Stolfo et al. |
| 9,043,905 B1 | 5/2015 | Allen et al. |
| 9,124,622 B1 | 9/2015 | Falkowitz et al. |
| 9,152,808 B1 | 10/2015 | Ramalingam et al. |
| 9,240,976 B1 | 1/2016 | Murchison |
| 9,325,728 B1 | 4/2016 | Kennedy et al. |
| 9,356,942 B1 | 5/2016 | Joffe |
| 9,386,030 B2 | 7/2016 | Vashist et al. |
| 9,495,188 B1 | 11/2016 | Ettema et al. |
| 2002/0066034 A1 | 5/2002 | Schlossberg et al. |
| 2002/0194489 A1 | 12/2002 | Almogy et al. |
| 2003/0084349 A1 | 5/2003 | Friedrichs et al. |
| 2003/0110396 A1 | 6/2003 | Lewis et al. |
| 2003/0145224 A1 | 7/2003 | Bailey |
| 2004/0088581 A1 | 5/2004 | Brawn et al. |
| 2004/0128543 A1 | 7/2004 | Blake et al. |
| 2004/0148521 A1 | 7/2004 | Cohen et al. |
| 2004/0160903 A1 | 8/2004 | Gai et al. |
| 2004/0172557 A1 | 9/2004 | Nakae et al. |
| 2004/0255155 A1 | 12/2004 | Stading |
| 2005/0114711 A1 | 5/2005 | Hesselink et al. |
| 2005/0132206 A1 | 6/2005 | Palliyil et al. |
| 2005/0149480 A1 | 7/2005 | Deshpande |
| 2005/0235360 A1 | 10/2005 | Pearson |
| 2006/0010493 A1 | 1/2006 | Piesco et al. |
| 2006/0041761 A1 | 2/2006 | Neumann et al. |
| 2006/0069697 A1 | 3/2006 | Shraim et al. |
| 2006/0101516 A1 | 5/2006 | Sudaharan et al. |
| 2006/0161982 A1 | 7/2006 | Chari et al. |
| 2006/0224677 A1 | 10/2006 | Ishikawa et al. |
| 2006/0242701 A1 | 10/2006 | Black et al. |
| 2007/0028301 A1 | 2/2007 | Shull et al. |
| 2007/0039038 A1 | 2/2007 | Goodman et al. |
| 2007/0157315 A1 | 7/2007 | Moran |
| 2007/0192853 A1 | 8/2007 | Shraim et al. |
| 2007/0226796 A1 | 9/2007 | Gilbert et al. |
| 2007/0299777 A1 | 12/2007 | Shraim et al. |
| 2008/0016570 A1 | 1/2008 | Capalik |
| 2008/0086773 A1 | 4/2008 | Tuvell et al. |
| 2008/0155693 A1 | 6/2008 | Mikan et al. |
| 2009/0019547 A1 | 1/2009 | Palliyil et al. |
| 2009/0144827 A1 | 6/2009 | Peinado et al. |
| 2009/0222920 A1 | 9/2009 | Chow et al. |
| 2009/0241173 A1 | 9/2009 | Troyansky |
| 2009/0241191 A1 | 9/2009 | Keromytis et al. |
| 2009/0241196 A1 | 9/2009 | Troyansky et al. |
| 2009/0328216 A1 | 12/2009 | Rafalovich et al. |
| 2010/0058456 A1 | 3/2010 | Jajodia et al. |
| 2010/0071051 A1 | 3/2010 | Choyi et al. |
| 2010/0077483 A1 | 3/2010 | Stolfo et al. |
| 2010/0082513 A1 | 4/2010 | Liu |
| 2010/0251369 A1 | 9/2010 | Grant |
| 2010/0269175 A1 | 10/2010 | Stolfo et al. |
| 2011/0016527 A1 | 1/2011 | Yanovsky et al. |
| 2011/0154494 A1 | 6/2011 | Sundaram et al. |
| 2011/0167494 A1 | 7/2011 | Bowen et al. |
| 2011/0214182 A1 | 9/2011 | Adams et al. |
| 2011/0258705 A1 | 10/2011 | Vestergaard et al. |
| 2011/0302653 A1 | 12/2011 | Frantz et al. |
| 2011/0307705 A1 | 12/2011 | Fielder |
| 2012/0005756 A1 | 1/2012 | Hoefelmeyer et al. |
| 2012/0084866 A1 | 4/2012 | Stolfo |
| 2012/0167208 A1 | 6/2012 | Buford et al. |
| 2012/0210388 A1 | 8/2012 | Kolishchak |
| 2012/0246724 A1 | 9/2012 | Sheymov et al. |
| 2012/0311703 A1 | 12/2012 | Yanovsky et al. |
| 2013/0061055 A1 | 3/2013 | Schibuk |
| 2013/0086691 A1 | 4/2013 | Fielder |
| 2013/0212644 A1 | 8/2013 | Hughes et al. |
| 2013/0227697 A1 | 8/2013 | Zandani |
| 2013/0263226 A1 | 10/2013 | Sudia |
| 2014/0082730 A1 | 3/2014 | Vashist et al. |
| 2014/0101724 A1 | 4/2014 | Wick et al. |
| 2014/0115706 A1 | 4/2014 | Silva et al. |
| 2014/0201836 A1 | 7/2014 | Amsler |
| 2014/0208401 A1 | 7/2014 | Balakrishnan et al. |
| 2014/0237599 A1 | 8/2014 | Gertner et al. |

(56) References Cited

U.S. PATENT DOCUMENTS

| | | |
|---|---|---|
| 2014/0259095 A1 | 9/2014 | Bryant |
| 2014/0298469 A1 | 10/2014 | Marion et al. |
| 2014/0310770 A1 | 10/2014 | Mahaffey |
| 2014/0337978 A1 | 11/2014 | Keromytis et al. |
| 2014/0359708 A1 | 12/2014 | Schwartz |
| 2015/0007326 A1 | 1/2015 | Mooring et al. |
| 2015/0013006 A1 | 1/2015 | Shulman et al. |
| 2015/0047032 A1 | 2/2015 | Hannis et al. |
| 2015/0074750 A1 | 3/2015 | Pearcy et al. |
| 2015/0074811 A1 | 3/2015 | Capalik |
| 2015/0096048 A1 | 4/2015 | Zhang et al. |
| 2015/0128246 A1 | 5/2015 | Feghali et al. |
| 2015/0156211 A1 | 6/2015 | Chi Tin et al. |
| 2015/0264062 A1 | 9/2015 | Hagiwara et al. |
| 2015/0326587 A1 | 11/2015 | Vissamsetty et al. |
| 2015/0326598 A1 | 11/2015 | Vasseur et al. |
| 2016/0019395 A1 | 1/2016 | Ramalingam et al. |
| 2016/0080414 A1 | 3/2016 | Kolton et al. |
| 2016/0212167 A1 | 7/2016 | Dotan et al. |
| 2016/0261608 A1 | 9/2016 | Hu et al. |
| 2016/0300227 A1 | 10/2016 | Subhedar et al. |
| 2016/0308895 A1 | 10/2016 | Kotler et al. |
| 2016/0323316 A1 | 11/2016 | Kolton et al. |
| 2016/0373447 A1 | 12/2016 | Akiyama et al. |
| 2017/0032130 A1 | 2/2017 | Joseph Durairaj et al. |

OTHER PUBLICATIONS

Wikipedia, Apple Filing Protocol, https://en.wikipedia.org/wiki/Apple_Filing_Protocol, Aug. 14, 2015.
Wikipedia, DMZ (computing), https://en.wikipedia.org/wiki/DMZ_(computing), Jun. 17, 2015.
Wikipedia, Domain Name System, https://en.wikipedia.org/wiki/Domain_Name_System, Jul. 14, 2015.
Wikipedia, Firewall (computing), https://en.wikipedia.org/wiki/Firewall_(computing), Jul. 14, 2015.
Wikipedia, Honeypot (computing), https://en.wikipedia.org/wiki/Honeypot_(computing), Jun. 21, 2015.
Wikipedia, Kerberos (protocol), https://en.wikipedia.org/wiki/Kerberos_(protocol), Jun. 30, 2015.
Wikipedia, Lightweight Directory Access Protocol, https://en.wikipedia.org/wiki/Lightweight_Directory_Access_Protocol, Aug. 15, 2015.
Wikipedia, LM hash, https://en.wikipedia.org/wiki/LM_hash, Jun. 8, 2015.
Wikipedia, RADIUS, https://en.wikipedia.org/wiki/RADIUS, Aug. 16, 2015.
Wikipedia, Rainbow table, https://en.wikipedia.org/wiki/Rainbow_table, Jul. 14, 2015.
Wikipedia, Secure Shell, https://en.wikipedia.org/wiki/Honeypot_(computing), Jul. 12, 2015.
Wikipedia, Security Information and Event Management, https://en.wikipedia.org/wiki/Security_information_and_event_management, Jun. 23, 2015.
Wikipedia, Tarpit (networking), https://en.wikipedia.org/wiki/Tarpit_(networking), Jul. 3, 2014.
Mishra et al., Intrusion detection in wireless ad hoc networks, IEEE Wireless Communications, Feb. 2004, pp. 48-60.
Zhang et al., Intrusion detection techniques for mobile wireless networks, Journal Wireless Networks vol. 9(5), Sep. 2003, pp. 545-556, Kluwer Academic Publishers, the Netherlands.
U.S. Appl. No. 15/004,904, Office Action, dated May 27, 2016, 16 pages.
U.S. Appl. No. 15/004,904, Notice of Allowance, dated Oct. 19, 2016, 13 pages.
U.S. Appl. No. 15/175,048, Notice of Allowance, dated Oct. 13, 2016, 17 pages.
U.S. Appl. No. 15/175,050, Office Action, dated Aug. 19, 2016, 34 pages.
U.S. Appl. No. 15/175,050, Office Action, dated Nov. 30, 2016, 31 pages.
U.S. Appl. No. 15/175,050, Notice of Allowance, dated Mar. 21, 2017, 13 pages.
U.S. Appl. No. 15/175,052, Office Action, dated Feb. 13, 2017, 19 pages.
U.S. Appl. No. 15/175,052, Office Action, dated Jun. 6, 2017, 19 pages.
U.S. Appl. No. 15/175,054, Notice of Allowance, dated Feb. 21, 2017, 13 pages.
U.S. Appl. No. 15/403,194, Office Action, dated Feb. 28, 2017, 13 pages.
U.S. Appl. No. 15/403,194, Notice of Allowance, dated Jun. 16, 2017, 9 pages.
U.S. Appl. No. 15/406,731, Notice of Allowance, dated Apr. 20, 2017.
PCT Application No. PCT/IL16/50103, International Search Report and Written Opinion, dated May 26, 2016, 9 pages.
PCT Application No. PCT/IL16/50579, International Search Report and Written Opinion, dated Sep. 30, 2016, 7 pages.
PCT Application No. PCT/IL16/50581, International Search Report and Written Opinion, dated Nov. 29, 2016, 10 pages.
PCT Application No. PCT/IL16/50582, International Search Report and Written Opinion, dated Nov. 16, 2016, 11 pages.
PCT Application No. PCT/IL16/50583, International Search Report and Written Opinion, dated Dec. 8, 2016, 10 pages.
U.S. Appl. No. 15/175,052, Notice of Allowance, dated Jan. 2, 2018, 9 pages.
U.S. Appl. No. 15/679,180, Notice of Allowance, dated Mar. 26, 2018, 14 pages.
U.S. Appl. No. 15/722,351, Office Action, dated Mar. 9, 2018, 17 pages.
U.S. Appl. No. 15/682,577, Notice of Allowance, dated Jun. 14, 2018, 15 pages.
U.S. Appl. No. 15/641,817, Office Action, dated Jul. 26, 2018, 29 pages.

\* cited by examiner

DETECTING ATTACKERS WHO TARGET CONTAINERIZED CLUSTERS

CROSS REFERENCES TO RELATED APPLICATIONS

This application is a continuation-in-part of U.S. patent application Ser. No. 15/722,351, entitled SYSTEM AND METHOD FOR CREATION, DEPLOYMENT AND MANAGEMENT OF AUGMENTED ATTACKER MAP, and filed on Oct. 2, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/722,351 is a continuation of U.S. patent application Ser. No. 15/403,194, now U.S. Pat. No. 9,787,715, entitled SYSTEM AND METHOD FOR CREATION, DEPLOYMENT AND MANAGEMENT OF AUGMENTED ATTACKER MAP, and filed on Jan. 11, 2017 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/403,104 is a continuation of U.S. patent application Ser. No. 15/004,904, now U.S. Pat. No. 9,553,885, entitled SYSTEM AND METHOD FOR CREATION, DEPLOYMENT AND MANAGEMENT OF AUGMENTED ATTACKER MAP, and filed on Jan. 23, 2016 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/004,904 is a nonprovisional of U.S. Provisional Application No. 62/172,251, entitled SYSTEM AND METHOD FOR CREATION, DEPLOYMENT AND MANAGEMENT OF AUGMENTED ATTACKER MAP, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated herein in their entirety.

U.S. patent application Ser. No. 15/004,904 is a nonprovisional of U.S. Provisional Application No. 62/172,253, entitled SYSTEM AND METHOD FOR MULTI-LEVEL DECEPTION MANAGEMENT AND DECEPTION SYSTEM FOR MALICIOUS ACTIONS IN A COMPUTER NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated by reference herein in their entirety.

U.S. patent application Ser. No. 15/004,904 is a nonprovisional of U.S. Provisional Application No. 62/172,255, entitled METHODS AND SYSTEMS TO DETECT, PREDICT AND/OR PREVENT AN ATTACKER'S NEXT ACTION IN A COMPROMISED NETWORK, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated by reference herein in their entirety.

U.S. patent application Ser. No. 15/004,904 is a nonprovisional of US Provisional Application No. 62/172,259, entitled MANAGING DYNAMIC DECEPTIVE ENVIRONMENTS, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated by reference herein in their entirety.

U.S. patent application Ser. No. 15/004,904 is a nonprovisional of US Provisional Application No. 62/172,261, entitled SYSTEMS AND METHODS FOR AUTOMATICALLY GENERATING NETWORK ENTITY GROUPS BASED ON ATTACK PARAMETERS AND/OR ASSIGNMENT OF AUTOMATICALLY GENERATED SECURITY POLICIES, and filed on Jun. 8, 2015 by inventors Shlomo Touboul, Hanan Levin, Stephane Roubach, Assaf Mischari, Itai Ben David, Itay Avraham, Adi Ozer, Chen Kazaz, Ofer Israeli, Olga Vingurt, Liad Gareh, Israel Grimberg, Cobby Cohen, Sharon Sultan and Matan Kubovsky, the contents of which are hereby incorporated by reference herein in their entirety.

FIELD OF THE INVENTION

The present invention relates to computer security, and in particular to preventing attackers from breaching computer networks.

BACKGROUND OF THE INVENTION

Reference is made to FIG. 1, which is a simplified diagram of a prior art enterprise network 100 connected to an external internet 10. Network 100 is shown generally with resources including computers 110, databases 120, switches and routers 130, and mobile devices 140 such as smart phones and tablets, for ease of presentation, although it will be appreciated by those skilled in the art that enterprise networks today are generally much more complex and include other devices such as printers, other types of network elements such as relays, and any Internet of Things objects. The various connections shown in FIG. 1 may be direct or indirect, wired or wireless communications, or a combination of wired and wireless connections. Computers 110 and databases 120 may be physical elements or logical elements, or a mix of physical and logical elements. Computers 110 and databases 120 may be virtual machines. Computer 110 and databases 120 may be local, remote or cloud-based elements, or a mix of local, remote and cloud-based elements. Computers 110 may be client workstation computers, or server computers including inter alia file transfer protocol (FTP) servers, email servers, structured query language (SQL) servers, secure shell (SSH) servers and other application servers, or a mix of client and server computers. A corporate information technology (IT) department manages and controls network 100 in order to serve the corporate requirements and meet the corporate needs.

Access to computers 110 and servers 120 in network 100 may optionally be governed by an access governor 150, such as a directory service, that authorizes users to access computers 110 and databases 120 based on "credentials". Access governor 150 may be a name directory, such as ACTIVE DIRECTORY® developed by Microsoft Corporation of Redmond, Wash., for WINDOWS® environments. Background information about ACTIVE DIRECTORY® is available at Wikipedia. Other access governors for WINDOWS and non-WINDOWS environments, include inter alia Lightweight Directory Access Protocol (LDAP), Remote Authentication Dial-In User Service (RADIUS), and Apple Filing Protocol (AFP), formerly APPLETALK®, developed by Apple Inc. of Cupertino, Calif. Background information about LDAP, RADIUS and AFP is available at Wikipedia.

Access governor 150 may be one or more local machine access controllers. Access governor 150 may be one or more authorization servers, such as a database server or an application server.

In lieu of access governor 150, the endpoints and/or servers of network 100 determine their local access rights.

Credentials for accessing computers 110 and databases 120 include inter alia server account credentials such as <address> <username> <password> for an FTP server, an SQL server, or an SSH server. Credentials for accessing computers 110 and databases 120 also include user login credentials <username> <password>, or <username> <ticket>, where "ticket" is an authentication ticket, such as a ticket for the Kerberos authentication protocol or NTLM hash used by Microsoft Corp., or login credentials via certificates or via another implementation used today or in the future. Background information about the Kerberos protocol and the LM hash is available at Wikipedia.

Access governor 150 may maintain a directory of computers 110, databases 120 and their users. Access governor 150 authorizes users and computers, assigns and enforces security policies, and installs and updates software. When a user logs into a computer 110, access governor 150 checks the submitted password, and determines if the user is an administrator (admin), a normal user (user) or other user type.

Computers 110 may run a local or remote security service, which is an operating system process that verifies users logging in to computers and other single sign-on systems and other credential storage systems.

Network 100 may include a security information and event management (SIEM) server 160, which provides real-time analysis of security alerts generated by network hardware and applications. Background information about SIEM is available at Wikipedia.

Network 100 may include a domain name system (DNS) server 170, or such other name service system, for translating domain names to IP addresses. Background information about DNS is available at Wikipedia.

Network 100 may include a firewall 180 located within a demilitarized zone (DMZ), which is a gateway between enterprise network 100 and external internet 10. Firewall 180 controls incoming and outgoing traffic for network 100. Background information about firewalls and DMZ is available at Wikipedia.

One of the most prominent threats that organizations face is a targeted attack; i.e., an individual or group of individuals that attacks the organization for a specific purpose, such as stealing data, using data and systems, modifying data and systems, and sabotaging data and systems. Targeted attacks are carried out in multiple stages, typically including inter alia reconnaissance, penetration, lateral movement and payload. Lateral movement involves orientation, movement and propagation, and includes establishing a foothold within the organization and expanding that foothold to additional systems within the organization.

In order to carry out the lateral movement stage, an attacker, whether a human being who is operating tools within the organization's network, or a tool with "learning" capabilities, learns information about the environment it is operating in, such as network topology and organization structure, learns "where can I go from my current step" and "how can I go from my current step (privileged required)", and learns implemented security solutions, and then operates in accordance with that data. One method to defend against such attacks, termed "honeypots", is to plant and monitor misleading information/decoys/bait, with the objective of the attacker learning of their existence and then consuming those bait resources, and to notify an administrator of the malicious activity. Background information about honeypots is available at Wikipedia.

Conventional honeypot systems operate by monitoring access to a supervised element in a computer network. Access monitoring generates many false alerts, caused by non-malicious access from automatic monitoring systems and by user mistakes. Conventional systems try to mitigate this problem by adding a level of interactivity to the honeypot, and by performing behavioral analysis of suspected malware if it has infected the honeypot itself.

An advanced attacker may use different attack techniques to enter a corporate network and to move laterally within the network in order to obtain its resource goals. The advanced attacker may begin with a workstation, server or any other network entity to start his lateral movement. He uses different methods to enter the first network node, including inter alia social engineering, existing exploit and/or vulnerability that he knows to exercise, and a Trojan horse or any other malware allowing him to control the first node.

Reference is made to FIG. 2, which is a simplified diagram of enterprise network 100 with attack vectors of an attacker at an early stage of lateral movement. Once an attacker has taken control of a first node in a corporate network, he uses different advance attack techniques for orientation and propagation and discovery of additional ways to reach other network nodes in the corporate network. Attacker movement from node to node is performed via an "attack vector", which is an object in memory or storage of a first computer that may be used to access a second computer.

Exemplary attack vectors include inter alia credentials of users with enhanced privileges, existing share names on different servers, and details of an FTP server, an email server, an SQL server or an SSH server and its credentials. Attack vectors are often available to an attacker because a user did not log off his workstation or clear his cache. E.g., if a user contacted a help desk and gave the help desk remote access to his workstation and did not log off his workstation, then the help desk access credentials may still be stored in the user's local cache and available to the attacker. Similarly, if the user accessed an FTP server, then the FTP account login parameters may be stored in the user's local cache or profile and available to the attacker.

Attack vectors enable inter alia a move from workstation A→server B based on a shared name and its credentials, connection to a different workstation using local admin credentials that reside on a current workstation, and connection to an FTP server using specific access credentials.

Reference is made to FIG. 3, which is a simplified diagram of enterprise network 100 with attack paths of an attacker at a later stage of lateral movement. Whereas IT "sees" the logical and physical network topology, an attacker that lands on the first network node "sees" attack vectors that depart from that node and move laterally to other nodes. The attacker can move to such nodes and then follow "attack paths" by successively discovering attack vectors from node to node.

When the attacker implements such a discovery process on all nodes in the network, he will be able to "see" all attack vectors of the corporate network and generate a "maximal attack map". Before the attacker discovers all attack vectors on network nodes and completes the discovery process, he generates a "current attack map" that is currently available to him.

An objective of the attacker is to discover an attack path that leads him to a target network node. The target may be a bank authorized server that is used by the corporation for ordering bank account transfers of money, it may be an FTP server that updates the image of all corporate points of sale, it may be a server or workstation that stores confidential information such as source code and secret formulas of the corporation, or it may be any other network node that is of value to the attacker and is his "attack goal node".

When the attacker lands on the first node, but does not know how to reach the attack goal node, he generates a current attack map that leads to the attack goal node.

It is common today for networks to include containerized clusters. Conventional network security systems are designed for non-containerized networks. It is more common for containerized networks, which include many servers, to hold sensitive data and services, more so than non-containerized environments that mostly include workstations that generally do not hold sensitive data.

Current network security solutions prevent attacks by examining configuration files and noticing violations. Such solutions always have a human element, and there are always errors in the environment that cannot be addressed.

It would thus be of great advantage to have methods and systems to protect against attackers who target containerized clusters.

SUMMARY

Embodiments of the present invention provide methods and systems to protect against attackers who target containerized clusters.

Embodiments of the present invention address containerized networks. These embodiments detect attackers as they land on container instances and push their way towards the most important assets in the environment, referred to as "crown jewels". These embodiments hinder attackers in case container orchestrator and configuration files have been compromised.

Embodiments of the present invention detect, with no false positives, attackers who exploit human errors; specifically, attackers who land on a specific instance, generally from the outside world, and attackers who reach the orchestrator/configuration, either from the API or by actually finding the files.

Embodiments of the present invention provide approaches to generating deceptions that protect the orchestrator, and modify the data that might be intercepted by an attacker in such ways that lead an attacker towards traps.

There is thus provided in accordance with an embodiment of the present invention a system for detecting and hindering attackers who target containerized clusters, including a container orchestrator that manages, deploys and monitors a number of container instances, a container registry comprising a collection of configuration files that hold the definition of the environment that is managed by the container orchestrator, at least one host, at least one database, at least one file share, and a management server that learns the environment, creates deceptions in accordance with the environment learned, plants the created deceptions via the container orchestrator, via the container registry, and via a secure share (SSH) directly to the containers, and issues an alert when at attacker attempts to connect to a deceptive entity.

There is additionally provided in accordance with an embodiment of the present invention a method for operation of a deception management server, for detecting and hindering attackers who target containerized clusters of a network, including learning the network environment, including finding existing container instances, finding existing services and relationships, extracting naming conventions in the environment, and classifying the most important assets in the environment, creating deceptions based on the learning phase, the deceptions including one or more of (i) secrets, (ii) environment variables pointing to deceptive databases, web servers or active directories, (iii) mounts, (iv) additional container instances comprising one or more of file server, database, web applications and SSH, (v) URLs to external services, and (vi) namespaces to fictional environments, planting the created deceptions via a container orchestrator, via an SSH directly to the containers, or via the container registry, and issuing an alert when an attacker attempts to connect to a deceptive entity.

BRIEF DESCRIPTION OF THE DRAWINGS

The present invention will be more fully understood and appreciated from the following detailed description, taken in conjunction with the drawings in which.

For reference to the figures, the following index of elements and their numerals is provided. Similarly numbered elements represent elements of the same type, but they need not be identical elements.

Figure 1:
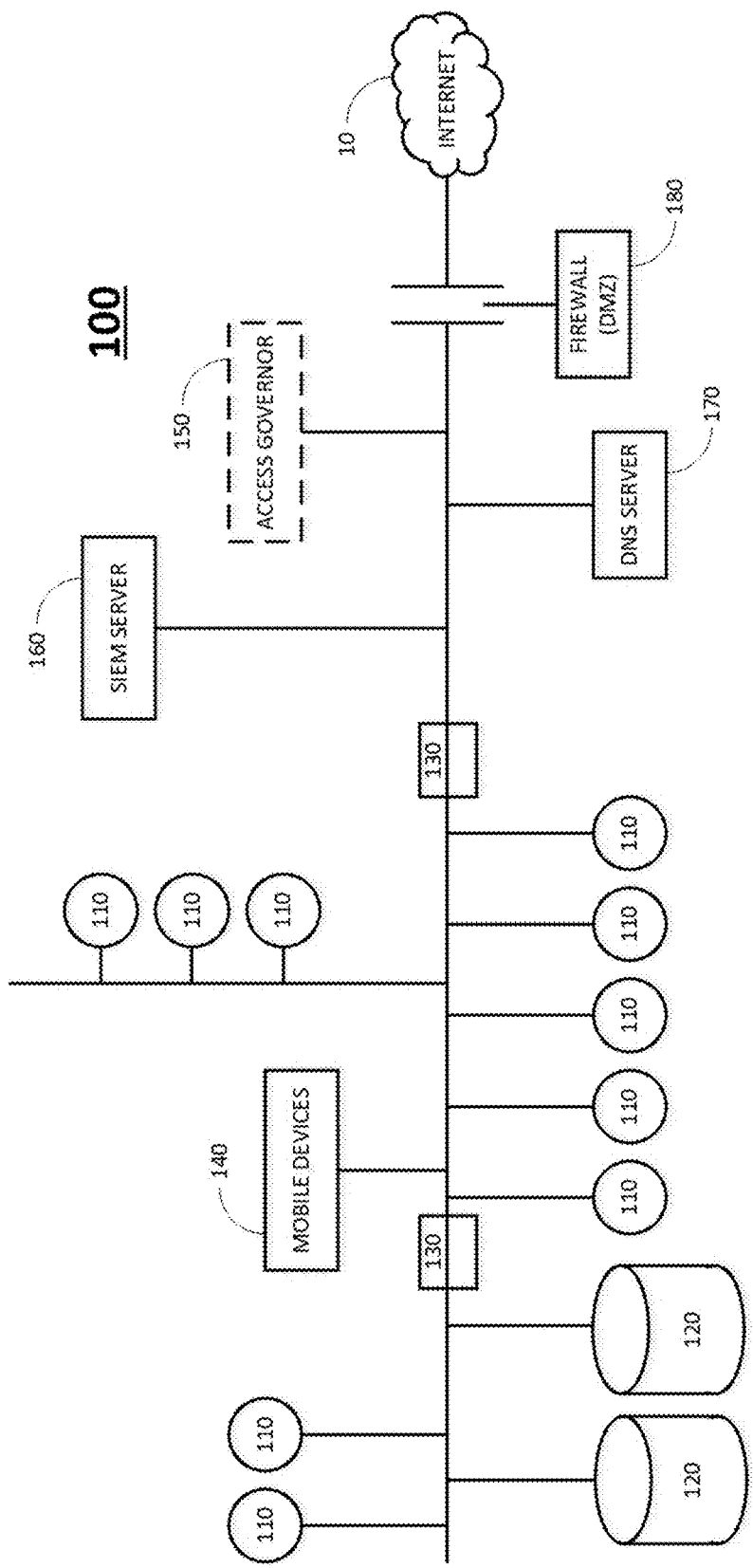
FIG. 1 is a simplified diagram of a prior art enterprise network connected to an external internet.
Figure 2:
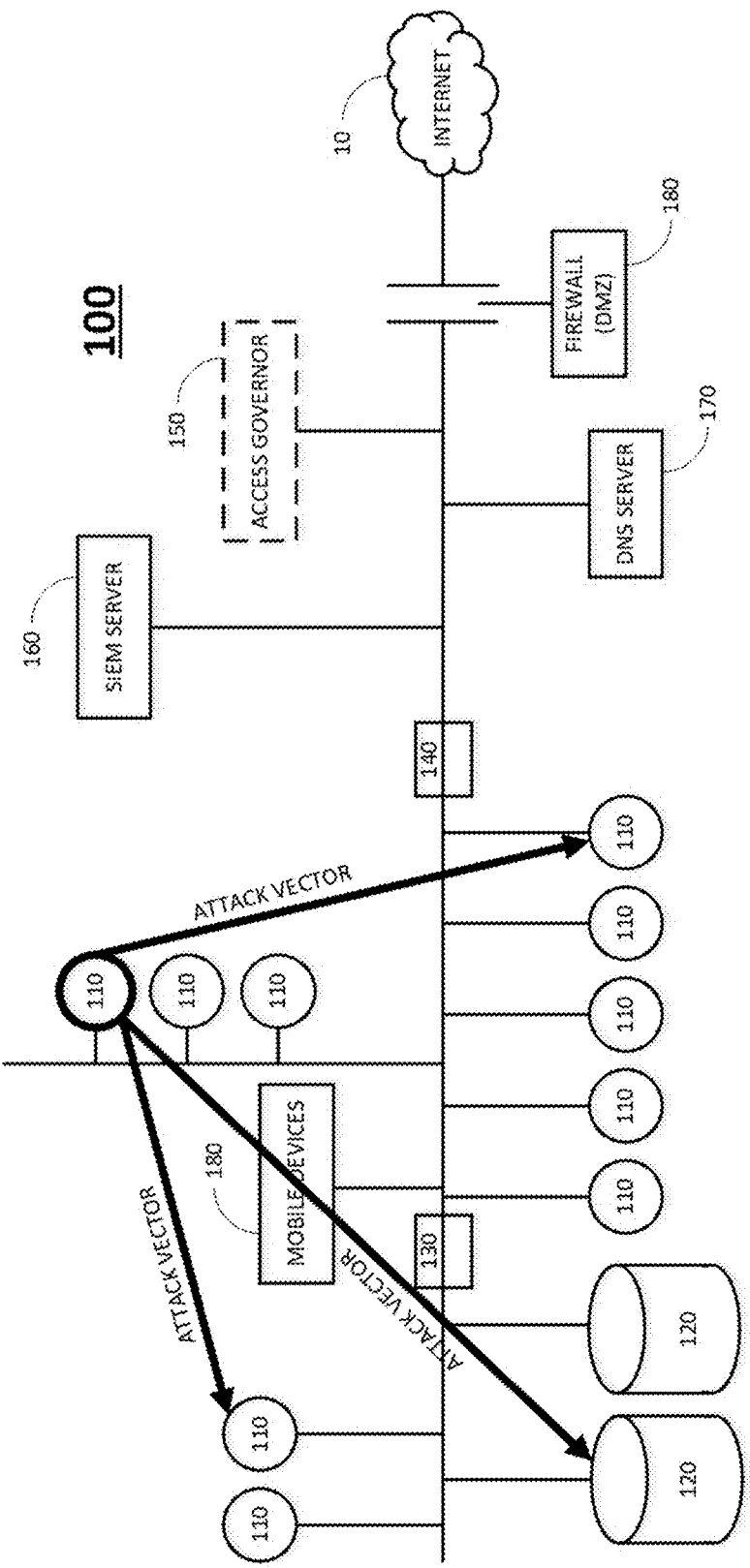
FIG. 2 is a simplified diagram of a prior art enterprise network with attack vectors of an attacker at an early stage of lateral movement.
Figure 3:
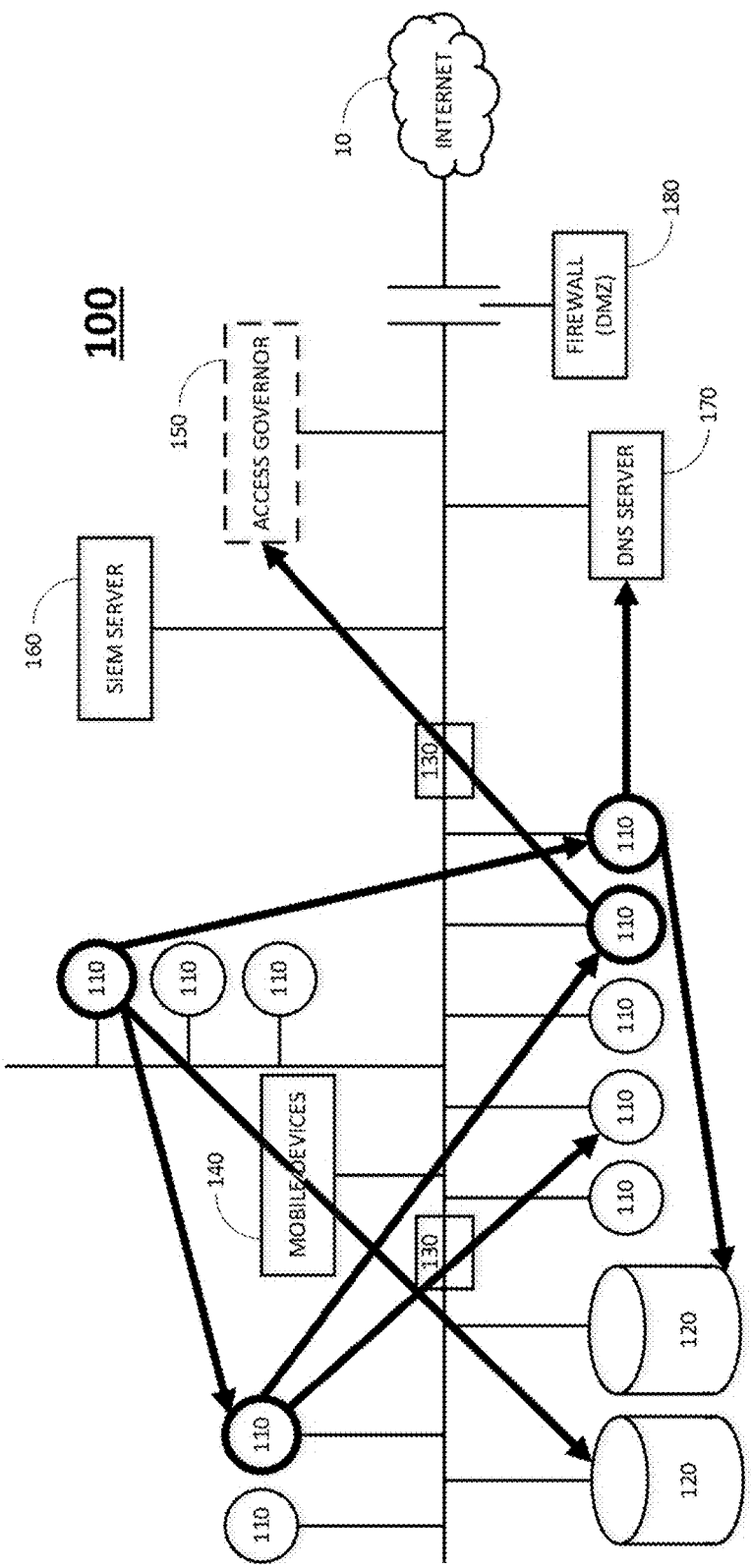
FIG. 3 is a simplified diagram of a prior art enterprise network with attack paths of an attacker at a later stage of lateral movement.

| Table of elements in the figures | |
|---|---|
| Element | Description |
| 10 | Internet |
| 100 | prior art enterprise network |
| 110 | network computers |
| 120 | network databases |
| 130 | network switches and routers |
| 140 | mobile devices |
| 150 | access governor (optional) |
| 160 | SIEM server |
| 170 | DNS server |
| 180 | firewall |
| 200 | enterprise network with network surveillance |
| 210 | deception management server |
| 211 | policy manager |
| 212 | deployment module |
| 213 | forensic application |
| 220 | database of credential types |
| 230 | policy database |
| 240 | trap servers |
| 241 | tar-pit modules |
| 242 | forensic alert module |
| 250 | update server |
| 300 | prior art container configuration |
| 310 | container orchestrator |
| 320 | container registry |
| 325 | container image |
| 326 | deceptive container image |
| 330 | configuration repository |
| 340 | file share server |
| 341 | deceptive file share server |
| 350 | network host |
| 351 | deceptive network host |
| 355 | container instance |
| 356 | deceptive container instance |
| 360 | database |
| 361 | deceptive database |
| 371 | deceptive secure shell |
| 400 | container configuration with deception system |

Elements numbered in the 1000's are operations of flow charts.

The following definitions are employed throughout the specification.

CONTAINERIZATION—refers to an operating system feature in which the kernel allows the existence of multiple isolated user-space instances. Such instances are referred to variously as "containers", "partitions", "virtualization engines", and "jails". Such instances appear as real computers from the vantage point of programs running in them. A computer program running on an ordinary operating system sees all resources of that computer, including inter alia connected devices, files and folders, network shares, CPU power and quantifiable hardware capabilities. However, programs running inside a container only see the container's contents and devices assigned to the container.

CONTAINER/CONTAINER INSTANCE—instantiations of a container image

CONTAINER ORCHESTRATOR—also referred to as "container manager", is an open source system for automatic deployment, scaling and management of containerized applications. A system that manages, deploys and monitors a large number of container instances.

CONTAINER REGISTRY—a collection of container images. The container orchestrator pulls images from the registry and deploys many container instances from a single image.

CONFIGURATION REPOSITORY—A collection of configuration files that hold the definition of the environment that is managed by the container orchestrator, such as a GITHUB® repository. Github is a registered trademark of Github, LLC, of San Francisco, Calif. An exemplary environment may include inter alia:
1. a cloud cluster with real pods;
2. a management server that invokes an orchestration server;
3. traps that are deployed as pods;
4. traps that are deployed out of the cluster; and
5. a YUM repository for installing packages with deceptions, so that an event is generated when an attacker tries to install a program.

KUBERNETES—an open-source container-orchestration system for automating deployment, scaling and management of containerized applications. KUBERNETES® is a registered trademark of Google Inc. of Mountainview, Calif.

KUBERNETES PODS—a group of containers that are deployed together on the same host.

DETAILED DESCRIPTION

In accordance with embodiments of the present invention, systems and methods are provided to protect against attackers who target containerized clusters.

Figure 4:
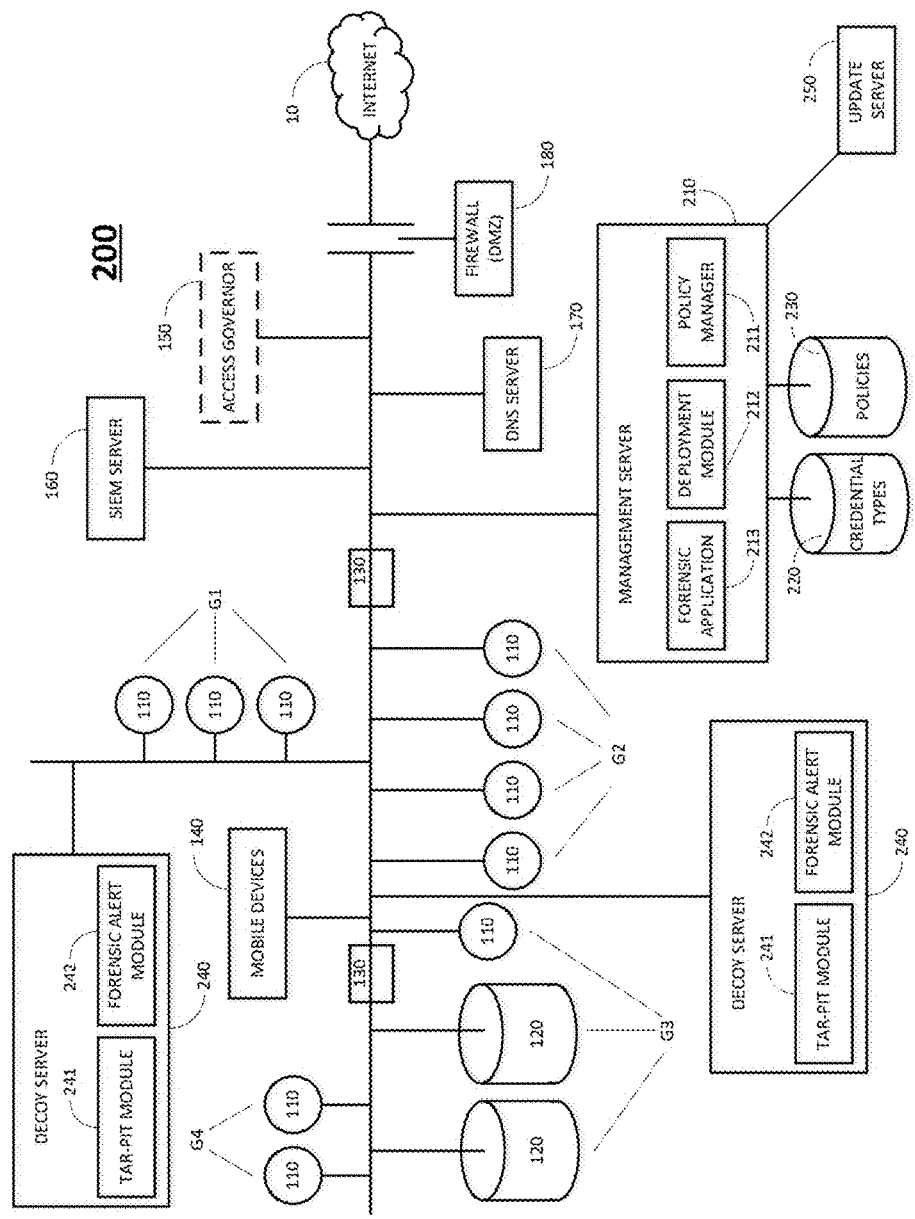
FIG. 4 is a simplified diagram of an enterprise network with network surveillance, in accordance with an embodiment of the present invention.

Reference is made to FIG. 4, which is a simplified diagram of an enterprise network 200 with network surveillance, in accordance with an embodiment of the present invention. Network 200 includes a deception management server 210, a database 220 of decoy attack vectors, a policy database 230 and trap servers 240. In addition, network computers 110 and databases 120 are grouped into groups G1, G2, G3 and G4.

Any or all of the components of network 200 may be replaced by containers that are managed by an orchestrator 310 (FIG. 7), which makes parts of it available to the instances it manages. Intercepting that data, either from inside the container, or by other means may present the attacker with a partial or full map of the network ("Attacker view").

A deception approach to protecting such orchestrator requires modifying the data that might be intercepted, in such a way that lead an attacker to traps.

Database 220 stores attack vectors that fake movement and access to computers 110, databases 120 and other resources in network 200. Attack vectors include inter alia:
user credentials of the form <username> <password>
user credentials of the form <username> <hash of password>
user credentials of the form <username> <ticket>
FTP server credentials of the form <address> <username> <password>
SSH server credentials of the form <address> <username> <password>

The attack vectors stored in database 220 are categorized by families, such as inter alia
F1—user credentials
F2—connections
F3—FTP logins
F4—secure shell (SSH) logins
F5—share names
F6—databases
F7—network devices
F8—URLs
F9—Remote Desktop Protocol (RDP)
F10—recent command
F11—scanners Credentials for a computer B that reside on a computer A provide an attack vector for an attacker from computer A→computer B.

Database 220 communicates with an update server 250, which updates database 220 as attack vectors for accessing, manipulating and hopping to computers evolve over time.

Policy database 230 stores, for each group of computers, G1, G2, . . . , policies for planting decoy attack vectors in computers of that group. Each policy specifies decoy attack vectors that are planted in each group, in accordance with attack vectors stored in database 220. For user credentials, the decoy attack vectors planted on a computer lead to another resource in the network. For attack vectors to access an FTP or other server, the decoy attack vectors planted on a computer lead to a trap server 240.

It will be appreciated by those skilled in the art the databases 220 and 230 may be combined into a single database, or distributed over multiple databases.

Deception management server 210 includes a policy manager 211, a deployment module 212, and a forensic application 213. Policy manager 211 defines a decoy and response policy. The response policy defines different decoy types, different decoy combinations, response procedures, notification services, and assignments of policies to specific network nodes, network users, groups of nodes or users or both. Once policies are defined, they are stored in policy database 230 with the defined assignments.

Deception management server 210 obtains the policies and their assignments from policy database 230, and delivers them to appropriate nodes and groups. It than launches deployment module 212 to plant decoys in end points, servers, applications, routers, switches, relays and other entities in the network. Deployment module 212 plants each decoy, based on its type, in memory (RAM), disk, or in any other data or information storage area, as appropriate. Deployment module 212 plants the decoy attack vectors in such a way that the chances of a valid user accessing the decoy attack vectors are low. Deployment module 212 may or may not stay resident.

Forensic application 213 is a real-time application that is transmitted to a destination computer in the network, when a decoy attack vector is accessed by a computer 110. When forensic application 213 is launched on the destination computer, it identifies a process running within that computer 110 that accessed that decoy attack vector, logs the activities performed by the thus-identified process in a forensic report, and transmits the forensic report to deception management server 210.

Once an attacker is detected, a "response procedure" is launched. The response procedure includes inter alia various notifications to various addresses, and actions on a trap server such as launching an investigation process, and isolating, shutting down and re-imaging one or more network nodes. The response procedure collects information available on one or more nodes that may help in identifying the attacker's attack acts, attention and progress.

Each trap server 240 may be in the form of a container instance, a mounted folder and agent, and/or a real trap server. Each trap server 240 includes a tar-pit module 241, which is a process that purposely delays incoming connections, thereby providing additional time for forensic application 213 to launch and log activities on a computer 110 that is accessing the trap server. Each trap server 240 also includes a forensic alert module 242, which alerts management system 210 that an attacker is accessing the trap server via a computer 110 of the network, and causes deception management server 210 to send forensic application 213 to the computer that is accessing the trap server. In an alternative embodiment of the present invention, trap server 240 may store forensic application 213, in which case trap server 240 may transmit forensic application 213 directly to the computer that is accessing the trap server. In another alternative embodiment of the present invention, deception management server 210 or trap server 240 may transmit forensic application 213 to a destination computer other than the computer that is accessing the trap server 240.

Notification servers (not shown) are notified when an attacker uses a decoy. The notification servers may discover this by themselves, or by using information stored on access governor 150 and SIEM 160. The notification servers forward notifications, or results of processing multiple notifications, to create notification time lines or such other analytics.

Figure 5:
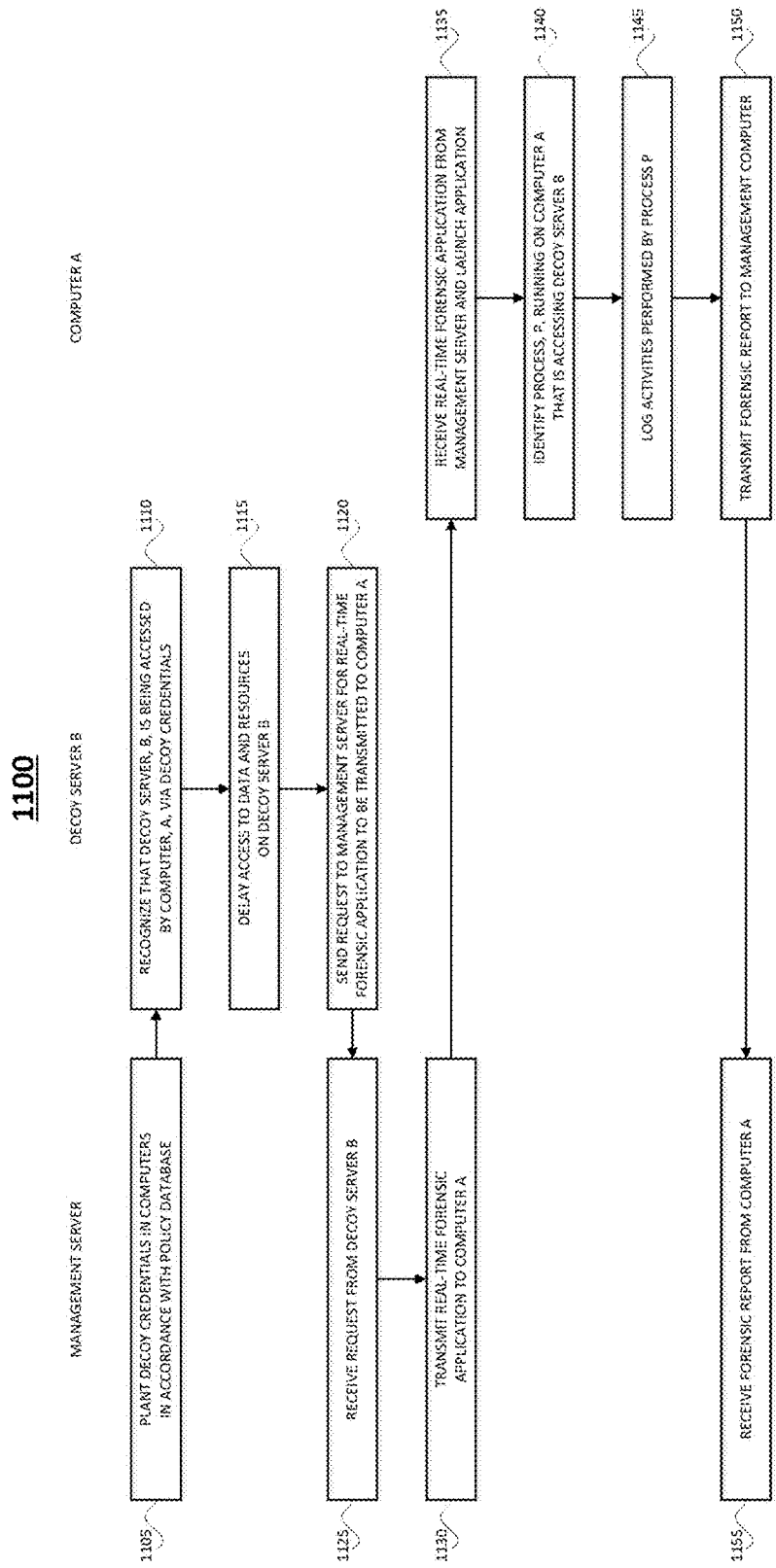
FIG. 5 is a simplified flowchart of a method for network surveillance and notification using trap servers, in accordance with an embodiment of the present invention.

Reference is made to FIG. 5, which is a simplified flowchart of a method 1100 for network surveillance and notification using trap servers, in accordance with an embodiment of the present invention. The flowchart of FIG. 5 is divided into three columns. The leftmost column includes operations performed by deception management server 210. The middle column includes operations performed by a trap server B that is accessed from a computer A using decoy attack vectors. The rightmost column includes operations performed by computer A.

At operation 1105, deployment module 212 plants decoy attack vectors in computers 110 in accordance with the policies in database 230. At operation 1110 trap server B recognizes that it is being accessed from a computer A via a decoy attack vector. At operation 1115, tar-pit module 241 of trap server B delays access to data and resources on trap server B. The delaying performed at operation 1115 provides additional time for trap server B to send a request to deception management server 210 to transmit forensic application 213 to computer A, and for computer A to receive and run forensic application 213. At operation 1120, trap server B sends a request to deception management server 210, to transmit real-time forensic application 213 to computer A.

At operation 1125, deception management server 210 receives the request send by trap server B, and at operation 1130 deception management server 210 transmits forensic application 213 to computer A.

At operation 1135, computer A receives forensic application 213 from deception management server 210, and launches the application. At operation 1140, forensic application 213 identifies a process, P, running on computer A that is accessing trap server B. At operation 1145, forensic application 213 logs activities performed by process P. At operation 1150, forensic application 213 transmits a forensic report to deception management server 210. Finally, at operation 1155, deception management server 210 receives the forensic report from computer A.

In accordance with an alternative embodiment of the present invention, trap server B may store forensic application 213, in which case trap server B may transmit forensic application 213 directly to computer A, and operations 1120, 1125 and 1130 can be eliminated.

In accordance with another alternative embodiment of the present invention, forensic application 213 is transmitted by deception management server 210 or by trap server B to a destination computer other than computer A. When the destination computer launches forensic application 213, the application communicates with computer A to identify the process, P, running on computer A that is accessing trap server B, log the activities performed by process P, and transmit the forensic report to deception management server 210.

Figure 6:
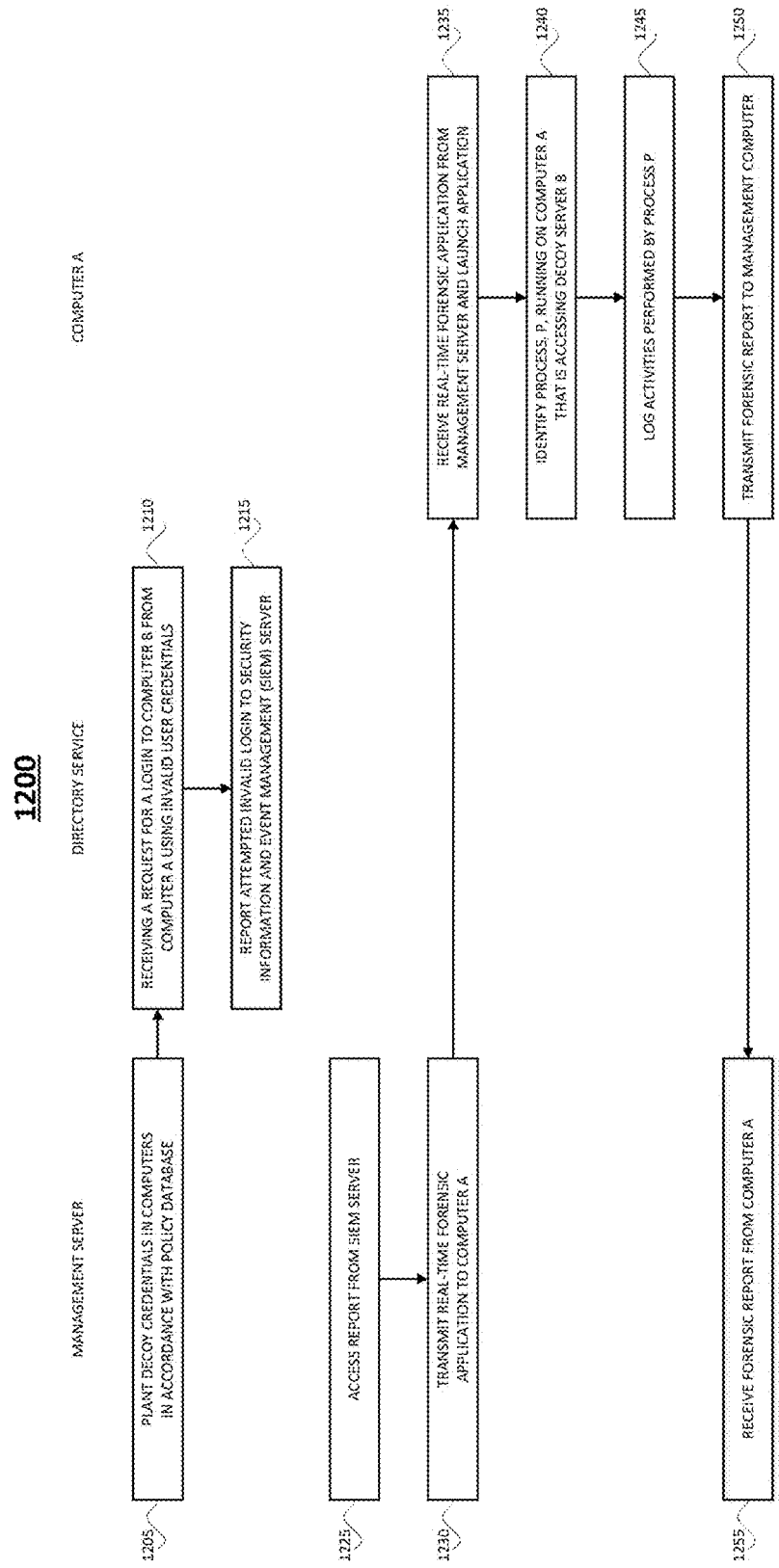
FIG. 6 is a simplified method for network surveillance and notification using decoy user credentials, in accordance with an embodiment of the present invention.

Reference is made to FIG. 6, which is a simplified method for network surveillance and notification using decoy user credentials, in accordance with an embodiment of the present invention. The flowchart of FIG. 6 is divided into three columns. The leftmost column includes operations performed by deception management server 210. The middle column includes operations performed by access governor 150. The rightmost column includes operations performed by a computer A that attempts to login to a computer B using decoy user credentials.

At operation 1205, deployment module 212 plants decoy credentials in computers 110 in accordance with the policies in database 230. At operation 1210 access governor 150 receives an authorization request from a computer B for a login to a computer A using invalid user credentials. At operation 1215 access governor 150 reports the attempted invalid login to SIEM server 160.

At operation 1225, deception management server 210 identifies an invalid login attempt event reported by SIEM server 160, and at operation 1230 deception management server 210 transmits real-time forensic application 213 to computer A.

At operation 1235, computer A receives forensic application 213 from deception management server 210, and launches the application. At operation 1240, forensic application 213 identifies a process, P, running on computer A that is accessing computer B. At operation 1245, forensic application 213 logs activities performed by process P. At operation 1250, forensic application 213 transmits a forensic report to deception management server 210. Finally, at operation 1255, deception management server 210 receives the forensic report from computer A.

In accordance with an alternative embodiment of the present invention, forensic application 213 is transmitted by deception management server 210 to a destination computer other than computer A. When the destination computer launches forensic application 213, the application communicates with computer A to identify the process, P, running on computer A that is accessing computer B, log the activities performed by process P, and transmit the forensic report to deception management server 210.

Containerized Clusters

It is common today for some portions of network 200 (FIG. 4), especially host database, host web server applications, and host file share applications, to be implemented using containers.

Non-containerized networks generally are confined within a net/subnet. In distinction, networks with containerized environments can reside in a cloud and have connections to resources out of the cloud. E.g., trap management may reside in or out of the cloud. A containerized network has predicable use since the user is a program or operator.

Containers are light-weight nodes in the network and, as such there are several key differences between a container node and a non-container node that change the attack vectors and how they can be mitigated.

Containers are stateless objects that are recreated from a read-only image as frequently as needed. As such, any changes made to a container instance by either an attacker or by a deception management tool are lost when the image is discarded. To protect container nodes, deceptions need to be planted either in the image or in the orchestrator before the container is instantiated.

When built properly, containers are very small and hold only the data and tools required for their immediate operation. As such, if any data of interest to an attacker exists on a container node, it is easier to find. The proverbial haystack doesn't hide the needle.

On the other hand, many of the most basic tools used by an attacker to study the network and perform lateral movement do not exist in a properly built container (even a word processor), and need to be installed by the attacker. As such, conventional attack vectors may not apply in a container node, or may require different approaches, such as manually installing tools required by the attacker, whereas other attack vectors present themselves that are unique to containerized systems; e.g.:

lateral movement to other network elements by inspecting the data made available to the container instance by the orchestrator;

vertical movement towards the container host; and vertical movement towards the orchestrator.

A container orchestrator, such as Kubernetes and Docker Swarm, manages multiple container instances, their configurations and their secrets, such as credentials, keys, and passwords. As such the orchestrator holds data of the entire cluster. E.g., the orchestrator may hold the entire network 200 of FIG. 4. Intercepting container data, from inside the container or by other means, may enable an attacker to generate a partial of full map of the network, and to perform lateral/vertical movements via crown-jewels or other critical servers within the network, whether in the cloud or in an on-premise data center. To protect the container orchestrator by use of deceptions, the data that may be intercepted is modified in such ways that lead an attacker towards a trap.

Embodiments of the present invention address containerized networks. These embodiments detect attackers as they land on container instances and push their way towards the "crown jewels". These embodiments hinder and detect attackers in case container orchestrator and configuration files have been compromised.

Embodiments of the present invention detect, with no false positives, attackers who exploit human errors; specifically, attackers who land on a specific instance, generally from the outside world, and attackers who reach the orchestrator/configuration, either from the API or by actually finding the files.

Embodiments of the present invention provide approaches to generating deceptions that protect the orchestrator, and modify the data that might be intercepted by an attacker in such ways that lead an attacker toward traps.

Figure 7:
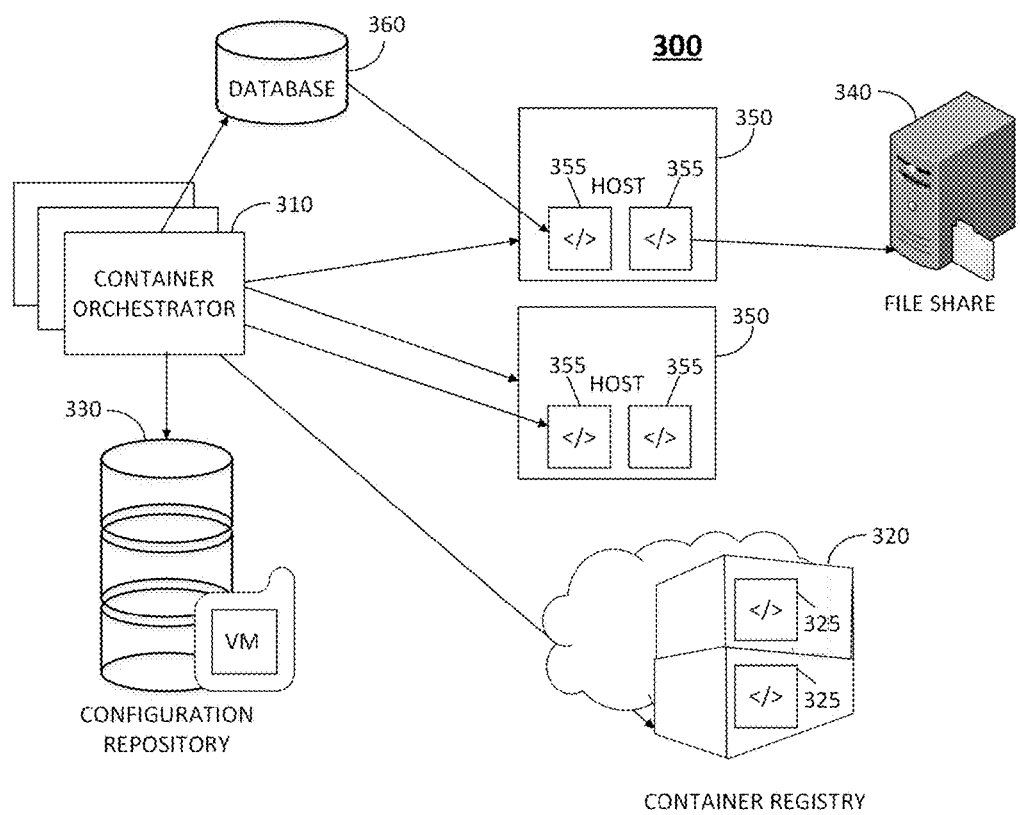
FIG. 7 is a prior art view of container configuration prior to application of a system in accordance with an embodiment of the present invention.

Reference is made to FIG. 7, which is a prior art view of a simple container configuration 300, prior to application of a system in accordance with an embodiment of the present invention. The left side of FIG. 7 shows the hardware for deploying and managing containers. The right side of FIG. 7 shows a portion of network 200 that uses containers within application hosts. FIG. 7 shows a container orchestrator 310, a container registry 320, a configuration repository 330, a file share 340, host machines 350, and a database 360. Container registry includes container images 325, and host machines 350 include container instances 355.

Figure 8:
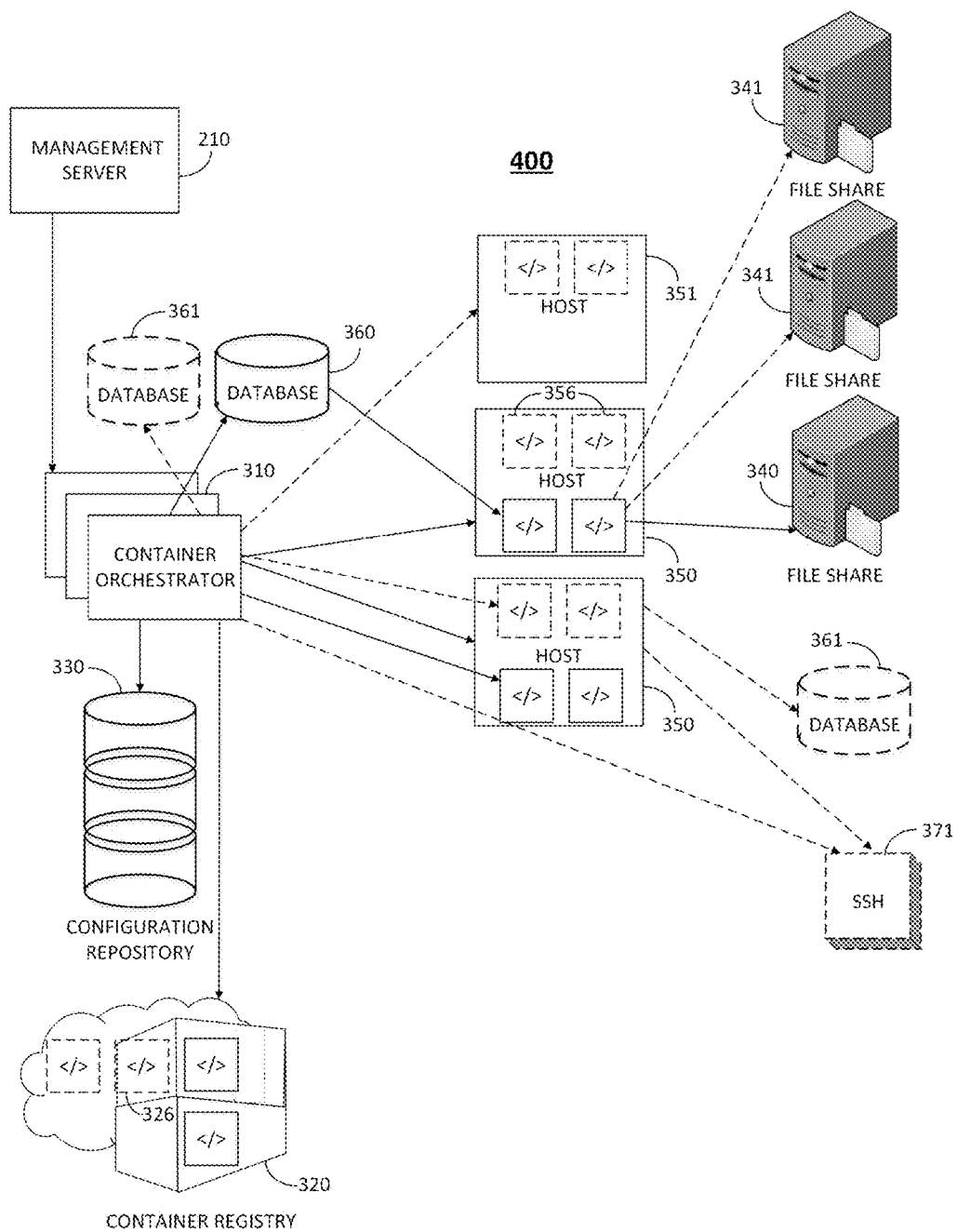
FIG. 8 is a simplified diagram of a container configuration that detects and hinders attackers who target containerized clusters, in accordance with an embodiment of the present invention.

Reference is made to FIG. 8, which is a simplified diagram of a container configuration 400 that detects and hinders attackers who target containerized clusters, in accordance with an embodiment of the present invention. The left side of FIG. 8 shows the hardware for deploying and managing containers. The right side of FIG. 8 shows a portion of network 200 that uses containers within application hosts, and a large number of deceptive entities indicated by dashed lines. Each deceptive entity is a trap or leads to a trap. FIG. 8 is a view of the container configuration of FIG. 7, subsequent to application of a system in accordance with an embodiment of the present invention. In addition to the components shown in FIG. 7, FIG. 8 includes management server 210 and several deceptive entities planted by management server 210. Deception/trap servers may take the form of a container instance, a mounted folder and agent, and a real trap.

FIG. 8 shows examples of deceptive entities, shown with dashed boundaries, that are added by an embodiment of the system of the present invention, including:

deceptive container image 326 in container registry 320;
deceptive container instances 356 deployed to real hosts 350;
deceptive hosts 351 including deceptive container instances;
deceptive file shares/mounts 341;
deceptive databases 361;
deceptive web applications (not shown); and
deceptive SSH server 371.

Figure 9:
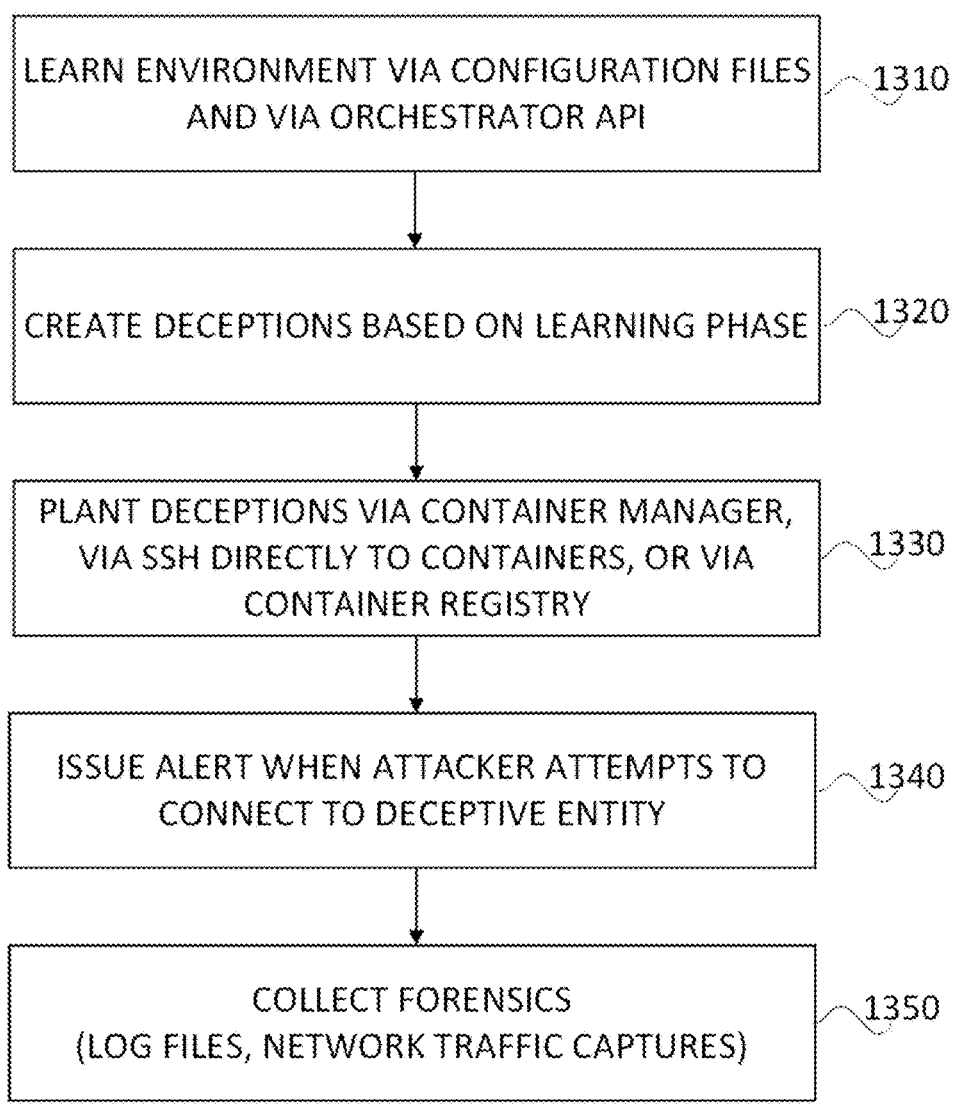
FIG. 9 is a simplified flowchart of a method for detecting and hindering attackers who target containerize clusters, in accordance with an embodiment of the present invention.

Reference is made to FIG. 9, which is a simplified flowchart of a method 1300 for detecting and hindering attackers who target containerize clusters, in accordance with an embodiment of the present invention. Prior to start of method 1300, management and detection servers are installed within network 200 (FIG. 4). At operation 1310 management server 210 learns the environment via configuration files and via the application programming interface of container orchestrator 310. The learning phase includes finding existing services and relationships, extracting naming conventions in the environment, and classifying the most important assets in the environment including inter alia database ports.

At operation 1320 management server 210 creates deceptions based on the learning phase. At operation 1330 management server 210 plants deceptions via container manager 310, an SSH directory to the containers, or container registry 320. Inter alia, the following deceptions may be planted:

secrets—keys, passwords;
environment variables—pointing to deceptive databases, deceptive web servers and/or a deceptive active directory;
mounts—service message block (SMB) share or drive;
additional container instances—file shares, databases, web applications, SSH storage;
URLs to external services—links; and
namespaces—to fictitious environments.

At operation 1340 management server 210 issues an alert when an attacker attempts to connect to a deceptive entity. The alert may be displayed on a console of management server 210.

At operation 1350 forensics, such as log files and network traffic captures, are collected. Management server 210 may connect to container orchestrator 310 and use container orchestrator 310 to collect forensics. Alternatively, container orchestrator 310 may attach a forensics tool to each deceptive container instance, and forensics may be collected from the deceptive container instance via the tool, when an attacker attempts to connect to the deceptive container instance. The forensic data may relate inter alia to memory, file system, process and network information.

There are two types of attack vectors that are addressed. For an attacker who gains access to the deceptive configuration files, either via the container orchestrator API or directly, the attacker will find a much larger containerized environment, and as soon as he tries to connect to a deceptive entity, such as one of the deceptions listed hereinabove, the attacker reaches a trap and is detected. E.g., if the attacker attempts to exploit a secret file with deceptive passwords to database, websites, and/or file shares, the attacker is led to a trap server 240 that triggers an alert.

For an attacker who exploits the container from the outside and directly gains access to the container instance, the attacker is confronted inter alia with deceptive attributes, tools and mounts, and as soon as the attacker attempts to use any of them, the attacker is detected. E.g., management server 210 may replace package managers, such as Yum, with proprietary tools that trigger an alert if an attacker attempts to access it. Alternatively, management server 210 may replace package repositories with a trap server 240. Alternatively, management server 210 may listen for outgoing traffic that is not supposed to go out of the container instance, and trigger an alert in response thereto.

For an attacker who breaches the container orchestrator 310, new secret files are added, with deceptive passwords to databases, websites and file shares. Detection is based on a trap machine that triggers an alert when someone connects to it.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A system for detecting and hindering attackers who target containerized clusters, comprising:
    a container orchestrator that manages, deploys and monitors a number of container instances;
    a container registry comprising a collection of configuration files that hold the definition of the environment that is managed by said container orchestrator;
    at least one host;
    at least one database;
    at least one file share; and
    a management server that learns the environment, creates deceptions in accordance with the environment learned, plants the created deceptions via said container orchestrator, via said container registry, or via a secure share (SSH) directly to the containers, and issues an alert when at attacker attempts to connect to a deceptive entity.

2. The system of claim 1 wherein the deceptions created by said management server include deceptive hosts with deceptive container instances, deceptive databases, deceptive file shares, deceptive container images in said container registry, deceptive container instances deployed in real hosts, deceptive SSH, deceptive mounts, and deceptive web applications.

3. The system of claim 1 wherein said management server creates deceptions by replacing package managers with proprietary tools that trigger an alert when accessed.

4. The system of claim 1 wherein said management server creates deceptions by replacing package repositories with a trap server.

5. The system of claim 1 wherein said management server listens to outgoing traffic that is not supposed to go out of the container instance, and issues an alert when such outgoing traffic is detected.

6. A method for operation of a deception management server, for detecting and hindering attackers who target containerized clusters of a network, comprising:

learning the network environment, comprising:
  finding existing container instances;
  finding existing services and relationships;
  extracting naming conventions in the environment; and
  classifying the most important assets in the environment;
creating deceptions based on the learning phase, the deceptions comprising one or more of (i) secrets, (ii) environment variables pointing to deceptive databases, web servers or active directories, (iii) mounts, (iv) additional container instances comprising one or more of file server, database, web applications and SSH, (v) URLs to external services, and (vi) namespaces to fictional environments;
planting the created deceptions via a container orchestrator, via an SSH directly to the containers, or via the container registry; and
issuing an alert when an attacker attempts to connect to a deceptive entity.

7. The method of claim 6 wherein said learning the network environment is based on configuration files and based on the container orchestrator application programming interface.

8. The method of claim 6 wherein said learning the network environment is based on a container instance.

9. The method of claim 6 wherein the deceptions created based on the learning phase include deceptive hosts with deceptive container instances, deceptive databases, deceptive file shares, deceptive container images in said container registry, deceptive container instances deployed in real hosts, deceptive SSH, deceptive mounts, and deceptive web applications.

10. The method of claim 6 wherein said creating deceptions comprises replacing package managers with proprietary tools that trigger an alert when accessed.

11. The method of claim 6 wherein said creating deceptions comprises replacing package repositories with a trap server.

12. The method of claim 6 further comprising listening to outgoing traffic that is not supposed to go out of the container instance, and wherein said issuing an alert comprises issuing an alert when such outgoing traffic is detected.

13. The method of claim 6 further comprising collecting forensics in the form of log files and network traffic captures from a deceptive container instance, when an attacker attempts to connect to the deceptive container instance.

14. The method of claim 13 further comprising attaching, via the container orchestrator API, a forensics tool to the deceptive container instance.

* * * * *